Patented Dec. 16, 1924.

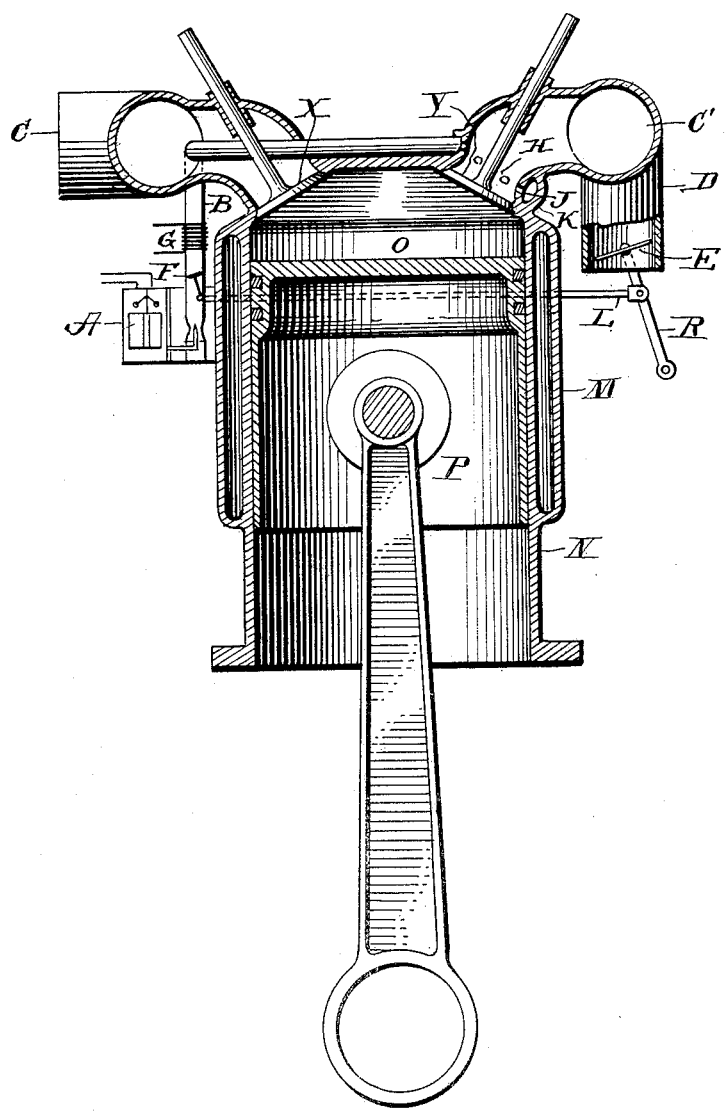

1,519,516

UNITED STATES PATENT OFFICE.

WALTER W. STRYKER, OF DAYTON, OHIO; EDWARD T. JONES ADMINISTRATOR OF SAID WALTER W. STRYKER, DECEASED.

FUEL VAPORIZER.

Application filed February 17, 1921. Serial No. 445,803.

*To all whom it may concern:*

Be it known that I, WALTER W. STRYKER, a citizen of the United States, residing at Dayton, in the county of Montgomery and State of Ohio, have invented certain new and useful Improvements in Fuel Vaporizers, of which the following is a specification.

This invention relates to internal combustion engines in general and more particularly to an improvement therein whereby heavy oils or low grade kerosenes or gasolines may be used as fuel therefor, insuring complete combustion without interfering with the volumetric efficiency of the fuel within the cylinders of the engine.

It will be readily understood that in order to utilize any fuels of the above named types in internal combustion engines it is necessary that the intake charge be of a high temperature when it enters the cylinder in order to insure complete combustion and thus avoid condensation.

In the present types of engines of the above mentioned class, it has been proposed to heat the intake manifolds with the hot exhaust gases. These devices, however, for insuring complete combustion within the cylinder, have proven unsatisfactory in that in these types of engines, the mixture of fuel vapor and air is heated unduly and thus expanded so that when it fills the combustion chamber in this unduly expanded condition it is found that there is an insufficient number of particles of fuel vapor present to cause a sufficient explosive force when ignited. By reason of such loss of explosive force the efficiency of the engine is lessened. It is proposed to provide a device whereby the fuel vapor alone may be heated by introducing the fuel intake manifold through the exhaust manifold and to provide a separate manifold for air. Thus the heated fuel vapor will come in contact with the air at a point close to the combustion chamber so that the mixture while being hot will not have expanded to any great degree. This being the case, the mixture while being heated sufficiently to aid in complete combustion, will maintain its volumetric efficiency.

The present preferred embodiment of my invention will be found in the accompanying specification and the attached drawings in which the figure is a vertical section through an internal combustion engine cylinder showing the improved fuel intake manifold.

As shown in the drawing N represents an engine cylinder, M the water jacket thereabout, and P the piston in said cylinder. Exhaust and intake manifolds C and C' are shown with their respective valves X and Y. Leading from the carburetor A is a pipe B which extends through the exhaust manifold C and adjacent the intake manifold C' communicating therewith through apertures J in the annular passage K. Also connected to the intake manifold C' is an air passage D controlled by valve E, operated by lever R. By means of the link L the valve F in the fuel intake pipe B may also be controlled by operating the lever R.

The fuel vapor coming from the carburetor A passes through the pipe B which, by reason of its position within the hot exhaust manifold C, heats the fuel vapor. Air at normal temperature, passes through the passage D and mixes in the venturi mixing chamber H, with the hot fuel vapor as it enters through the apertures J from the passage K which extends around the intake manifold and combustion chamber. When the intake valve Y is opened the mixture then passes into the combustion chamber O.

For starting purposes, when the exhaust manifold is cold, the fuel intake pipe B is provided with an electric heating coil G, for heating the fuel vapor.

It will be readily seen that, by reason of the hot fuel vapor and air mixing at a point in such close proximity to the combustion chamber, the mixture will neither have time to condense nor will it have time nor space in which to expand to any great degree and thereby cause a loss in the volumetric efficiency of the engine.

Having thus described my invention, I claim:

1. In an internal combustion engine, the combination of an inlet valve, a venturi mixing chamber adjacent thereto, the stem of the valve passing through the mixing chamber, and means for heating and delivering a combustible fluid to the said mixing chamber.

2. In an internal combustion engine, the combination of an inlet valve, a venturi mixing chamber adjacent thereto, the stem of the valve passing through the mixing chamber, and means heated by the exhaust of the engine for heating and delivering a combustible fluid to the said mixing chamber.

3. In an internal combustion engine, the combination with the inlet valve, of a mixing chamber adjacent the inlet valve, the stem of the valve passing through the mixing chamber, an annular passage surrounding the mixing chamber and communicating therewith, exhaust operated means for heating and delivering a combustible fluid to the said annular passage, and air inlet means for the mixing chamber.

In testimony whereof I have affixed my signature.

WALTER W. STRYKER.